United States Patent Office
3,133,897
Patented May 19, 1964

3,133,897
PRODUCTION OF POLYUREA COPOLYMERS FROM AN ALKYLENE DIAMINE, A HETERO-MEMBERED ALKYLENE DIAMINE AND A UREA
Yanosuke Inaba, Fujisawa, Kunihiko Miyake, Kamakura, and Koji Kimoto and Goro Kimura, Fujisawa, Japan, assignors to Toyo Koatsu Industries, Inc., Tokyo, Japan, a corporation of Japan
No Drawing. Filed Mar. 17, 1960, Ser. No. 15,515
Claims priority, application Japan Mar. 30, 1959
11 Claims. (Cl. 260—45.85)

The present invention relates generally to improvements in synthetic thermoplastic polymers and it relates more particularly to a polyurea copolymer and to a method for producing the same.

Fibers spun of polyurea polymers having linear alkylene groups possess excellent chemical and physical properties. They have a high tenacity, good elastic recovery and Young's modulus, good chemical resistance and other desirable characteristics. By reason of their high melting points and relatively low decomposition temperatures, however, the melt-spinning of these polyurea polymers into fibers possesses many disadvantages and drawbacks and is rather difficult on a commercial scale as compared with other synthetic fibers. This is particularly true where the alkylene radicals have a small number of carbon atoms and it is practically impossible to spin into fibers polyurea polymers having less than six carbons in their alkylene radicals. Whilst polyurea polymers having six or more carbons in their alkylene radicals may be melt-spun on a commercial scale, the resulting fiber is worsened in dyeability with an increase in the carbons of the alkylene radical.

In the meanwhile, fibers spun of polyurea polymers having hetero-membered alkylene radicals with at least one ether group (—O—) or one thio-ether group (—S—) possess excellent characteristics in dyeability and resistance to heat, but they have a relatively low Young's modulus, and consequently they lack in wool touch when woven into fabrics.

It is, therefore, a principal object of the present invention to provide an improved polyurea copolymer and a process for producing the same.

Another object of the present invention is to provide an improved polyurea copolymer with spinnability and good dyeability and a method of producing the same.

Still another object of the present invention is to provide an improved polyurea copolymer of the above nature which may be spun into fibers having superior physical and chemical properties.

The inventors have succeeded in eliminating the drawbacks innate in the above polyureas by producing a polyurea copolymer having superior and highly desirable chemical and physical properties in the following manner; a diamide compound such as urea, thiourea, alkylene diurea or dithiourea, at least one member of the group consisting of linear alkylene diamines having alkylene radicals with at least six carbons and their carbonates, and at least one member of the group consisting of hetero-membered alkylene diamines having at least one ether group or one thioether group wherein each alkylene radical has two to eight carbons and their carbonates, are reacted at a polycondensation temperature. The hetero-membered alkylene diamines having at least one ether group or one thioether group are compounds represented by the formulae $H_2N$—$R_1$—O—$R_2$—$NH_2$, $H_2N$—$R_1$—O—$R_2$—O—$R_3$—$NH_2$
$H_2N$—$R_1$—S—$R_2$—$NH_2$ and similar compounds and their carbonates in which $R_1$, $R_2$ and $R_3$ are alkylene radicals having two to eight carbons. As for the linear alkylene diamines may be employed in addition to those having six to nine carbons given in the following examples decamethylenediamine, undecamethylenediamine, dodecamethylenediamine and their carbonates.

To prepare the polyurea copolymer, a mixture of at least one linear alkylene diamine and at least one hetero-membered alkylene diamine having at least one ether group or one thioether group is further mixed with preferably an approximately equimolecular ratio of the diamide compound and is preferably though not necessarily dissolved in a solvent and heated in an inert gas atmosphere such as pure nitrogen at temperatures starting at 80° C. and raising up to 260° C. over a period of time sufficient to conclude polycondensation. As for the solvent are employed water, phenol and metacresol, of which water is preferred. The total amount of linear alkylene diamines and the hetero-membered alkylene diamines may be employed in 1–1.5 mols to 1 mol diamide compound, preferably in 1–1.04 mols. Actually a process comprising a combination of the following three stages may be used; a first stage wherein a mixture of at least one linear alkylene diamine and at least one hetero-membered alkylene diamine having at least one ether group or one thioether group is further mixed with preferably an approximately equimolecular ratio of the diamide compound and is preferably though not necessarily dissolved in the aforementioned solvent and heated in an inert gas atmosphere such as pure nitrogen at a temperature in the range between 80° C. and 130° C. for a period of time sufficient to substantially produce two molecular condensation products in each of which one molecule of urea is combined with a molecule of one of the alkylene diamines and the hetero-membered alkylene diamines employed. This is illustrated by the following equation:

$H_2N$—R—$NH_2$+$H_2N$—CO—$NH_2$→
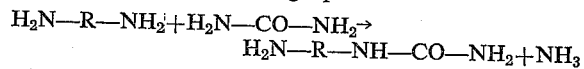

wherein R stands for the alkylene radicals and/or the hetero-membered alkylene radicals employed. In a second stage the two molecular condensation products are heated at a temperature in the range between 130° C. and 240° C. for a period of time sufficient to substantially produce half polymers wherein both terminal radicals are amino radicals.

In a third stage the temperature is gradually raised to 230° C.–260° C. with the distillation off of the solvent when it is employed. The heating is continued at the above temperature and under reduced pressure for a period of time sufficient to conclude the polycondensation reaction. In the reaction under reduced pressure a complete removal of the residual solvent as well as of the linear alkylene diamines and the hetero-membered alkylene diamines formed as by-products by amine exchange reactions which occurred to the half-polymer is carried out. The reaction under reduced pressure in the present invention is indispensable for raising the polymerization grade to such an extent as to enable the resulting polyurea copolymer to be obtained to be spun into fibers of excellent characteristics.

It is preferable to add to the reaction mixture in any stage prior to the third stage a viscosity stabilizer such as an alkyl-monoamide, an N-acylalkylene-diamine or a monobasic acid in which the alkyl or acyl radical has at least three and preferably six or more carbons in order to inhibit the so-called "urea-dearrangement" which would take place by heating the polyurea polymers at a high temperature. The stabilizer may be employed in 0.005–0.05 mol to 1 mol diamide compound, preferably in 0.01–0.025 mol.

The copolymer produced in accordance with the present process is characterized by its relatively low melting point, high decomposition temperature and excellent melt-spinning properties. Fibers spun of the copolymer possess excellent dyeing properties, high tenacity, good "Young's modulus, elastic recovery and other chemical and physical properties. The properties of the copolymer may be controlled by varying the relative proportions of the linear alkylene diamines and the hetero-membered alkylene diamines. For example, when a linear alkylene diamine and a hetero-membered alkylene diamine are employed in an equimolecular ratio, a copolymer of low melting and crystallinity is obtained. As the linear alkylene diamine proportion is increased, the Young's modulus of the copolymer approaches that of the polyurea polymer of the corresponding alkylene diamine while the copolymer still maintains excellent dyeability particularly with acid dyestuffs. The following table sets forth the relative dyeing velocities of various fibers and fibers produced in accordance with the present invention, employing acid dyes and dispersed dyes at a dyeing temperature of 100° C., a bath ratio of 100 and a dye concentration of 3%, the data being given in mg./gram min.

*Arbitrary Velocity Constant (mg./gram min) Table*

| | Acid Dye (pH=2) | Dispersed dye (pH=7) |
| --- | --- | --- |
| Polycaproamide | 32 | 28 |
| Nonamethylene polyurea | 19 | 18 |
| Octamethylene polyurea | 25 | 21 |
| Ditetramethylene ether hexamethylene polyurea [1] | 1,800 | 74 |
| Dipentamethylene ether octamethylene polyurea [1] | 1,600 | 60 |

[1] Mol ratio linear alkylene: alkylene ether=1:1.

The following examples, in which the parts are given by weight, are illustrative of the present invention:

EXAMPLE 1

A solution of 81 parts of hexamethylene diamine, 60 parts of 5-5'-diamino-dipentyl-ether, 60 parts of urea and 2.6 parts of palmitic acid amide (molal ratio—70:32:100:1) in three times by weight of m-cresol was heated at 120° C. for 8 hours in an inert gas atmosphere of substantially pure nitrogen. Thereafter, the heating was continued for 4 hours at 180° C. resulting in the evolution of ammonia and the condensation of the reactants, the mass gradually assuming a viscous state. The temperature was then raised to 250° C. and the pressure reduced to distill off the solvent and condensation copolymerization reaction completed to provide the molten copolymer which may be readily spun into fibers. The resultant copolymer resin had an intrinsic viscosity in m-cresol of 0.7 to 0.8 and a melting point of 190° C. to 195° C. The fibers spun from the copolymer resin had a tenacity of 4 to 5 grams per denier, a Young's modulus of 350 kg./cm.$^2$, and a dyeing velocity at a temperature of 100° C., a dye concentration of 3%, a bath ratio of 100 and a pH of 2 fifty times that of polycaprolactam.

EXAMPLE 2

A solution of 150 parts of the carbonate of octamethylene-diamine, 45 parts of the carbonate of 4.4'-diamino-dibutyl-ether, 60 parts of urea and 2.6 parts of palmitic acid (molal ratio—80:22:100:1) in 40 parts of water was heated for 40 hours at 100° C. in the presence of a substantially pure nitrogen atmosphere. The temperature was then gradually raised to 240° C. with the distillation of water, ammonia and carbon dioxide being released and the mass becoming viscous. The heating was continued at 240° C. for 2 hours at a reduced pressure to complete the condensation polymerization, the resulting molten copolymer being readily spinnable into fibers, and having a melting point of 210° C. and an intrinsic viscosity in m-cresol of 0.8 to 0.9. The copolymer fiber had a tenacity of 4 grams per denier, a Young's modulus of 400 kg./cm.$^2$ and a dyeing velocity of 60 times that of polycaprolactam under the dyeing conditions set forth in Example 1.

EXAMPLE 3

A solution of 20 parts of nonamethylenediamine, 142 parts of 3.5' diaminopropyl-amyl-ether, 132 parts of methylene diurea and 5.1 parts of palmitic acid (molal ratio—12:90:100:2) in 100 parts of water was heated for 35 hours at 100° C. and the temperature thereafter raised to 230° C., with the distillation of water and the evolution of ammonia, the reaction mass becoming viscous. The reaction was effected in the presence of a substantially pure nitrogen atmosphere. The heating of the mass was continued for 2 hours at 230° C. and at a pressure of 1 mm. of mercury to produce a readily spinnable copolymer having an intrinsic viscosity in m-cresol of 0.6 to 0.8. The resin had a low crystallinity and could be easily molded and formed into film and the fibers formed from the resin dyed deeply and uniformly with acid dyes.

EXAMPLE 4

A mixture of 77 parts of octamethylene diamine, 49 parts of hexamethylene diamine, 20 parts of 5.5'-diamino diamyl sulphide, 60 parts of urea and 1.2 parts of caproic acid (molal ratio: 50:42:10:100:1) were heated in a vessel in a nitrogen atmosphere for 10 hours, the temperature being gradually raised from 120° C. to 240° C. Ammonia was released and a viscous mass resulted which was further heated at 240° C. for three hours at a pressure of 1 mm. of mercury to complete the condensation polymerization and produce a readily spinnable copolymer having a melting point of 210° C. to 215° C. and an intrinsic viscosity in m-cresol of 0.6 to 0.7. The fiber spun from the copolymer had a tenacity of 4 to 5 grams per denier, excellent crispation and a dyeing velocity approximately 30 times that of polycaprolactam under the dyeing conditions set forth in Example 1.

EXAMPLE 5

95 parts of hexamethylene diamine, 41 parts of ethylene glycol bis (4-amino butyl ether), 60 parts of urea and 2.6 parts of N-caproyl nonamethylene diamine (molal ratio—82:20:100:1) were dissolved in 80 parts of phenol at 120° C. The reaction proceeded for 8 hours in the presence of a nitrogen atmosphere, the temperature being gradually increased and ammonia being vigorously released. Upon the diminution of the release of ammonia the temperature was raised to 210° C. to distill the phenol and then to 250° C. to produce a viscous mass. The heating was continued for two hours at 250° C. and at a pressure of 1 mm. of mercury to complete the condensation polymerization and produce a copolymer having an intrinsic viscosity in m-cresol of 0.6 to 0.7 and other properties similar to those of the copolymer in accordance with Example 1.

EXAMPLE 6

40 parts of the carbonate of heptamethylene diamine, 180 parts of the carbonate of 4.4'-diamino dibutyl ether, 76 parts of thiourea and 2.6 parts of palmitic acid amide (molal ratio—21:81:100:1) were placed in a vessel through which nitrogen was circulated to exclude air. The vessel was heated to 90° C. for 40 hours to effect the solution of the reactants and the reaction permitted to proceed. The temperature was raised to 180° C. over 5 hours with the accompanying violent release of ammonia. With a reduction in the evolution of ammonia the temperature was further raised with a continuation of the polycondensation and an increase in the mass viscosity. Upon the temperature reaching 250° C. the reaction was continued at this temperature for about three hours at a pressure of 1 mm. of mercury to produce a colorless, transparent molten mass of the copolymer. The copolymer possessed good spinning qualities as a chip, could be easily molded and possessed the properties of the copolymer produced in accordance with Example 4.

EXAMPLE 7

87 parts of octamethylene diamine, 84 parts of 5.5'-diamino diamyl sulphide, 76 parts of thiourea and 3 parts of pelargonic acid (molal ratio—60:41:100:2) were heated for 6 hours at 120° C. in 300 parts of phenol in a nitrogen atmosphere to effect the solution thereof. The temperature was then raised to between 160° C. and 180° C. with the accompanying violent release of ammonia. Upon the diminution of the ammonia evolution the temperature was raised to distill off the phenol and then further raised and maintained for about three hours at a temperature of 250° C. and at the reduced pressure of 1 mm. of mercury to complete the polycondensation to produce a molten copolymer of good spinnability and having a melting point of 210° C. to 215° C. A fiber melt-spun from the copolymer had a tenacity of 5 to 6 grams per denier, good resistance to sunlight and alkalis, and could be deeply and uniformly dyed with various types of dyes.

The following is a table of some of the properties of polyurea copolymers produced in accordance with the present invention as compared with other synthetic fibers:

*Properties of Hetero-Membered Polyurea Co-Polymers*

| Components | Molal Ratio of Components | Recovery of elasticity, percent (elongation 8%)[1] | Melting Point, ° C. | Decomposition Temperature, ° C. | Resistance against Abrasion Time[2] | Dyeability; Velocity Constant of Dyeing k(mg./g. hr.)[3] |
|---|---|---|---|---|---|---|
| 4.4' diamino dibutylether | | 100 | 216 | 278 | 270-400 | 2,000 |
| 4.4' diamino dibutylether and $C_8$ diamine | 4:1 | 97 | 203 | 277 | 260-400 | 1,900 |
| 4.4' diamino dibutylether and $C_9$ diamine | 4:1 | 90 | 205 | 275 | 250-400 | 1,700 |
| $C_9$ diamine only | | 87 | 236 | 282 | 100-180 | 15 |
| Nylon 6 | | 100 | 230 | higher than 300 | 250-500 | 32 |
| Terylen | | 80 | | | 50-100 | 0.1 |

[1] Instantaneous recovery of elasticity after 8% elongation release.
[2] Resistance against abrasion: The time required to break a fiber of 1000 deniers with a 500 g. weight by abrasion against a metal surface.
[3] Dyeability: With acid colors, Mitsui Brilliant Milling Red in a 3% solution at 100° C., a pH of 2, and a bath ratio of 100 for 1 hr.

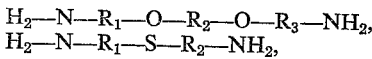

$$dx/dt = k\frac{s-x}{X}$$

$s$: Saturated color concentration in fiber
$x$: Color concentration in fiber after 1 hr. from start
$k$: Velocity constant of dyeing As many apparently widely different embodiments of this invention may be made without departing from the spirit and scope thereof, it is to be understood that the present invention is not limited to the specific embodiments thereof except as defined in the appended claims.

What is claimed is:

1. A process for the manufacture of polyurea copolymers with hetero-membered alkylene urea having good spinnability comprising reacting in a first stage at a temperature in the range of 80° C. to 130° C. to effect solution thereof in an inert atmosphere a mixture containing:
   (a) at least one and not more than two members of the group consisting of linear alkylene diamines having from 6 to 9 carbon atoms in the alkylene radical and carbonates thereof,
   (b) a member selected from the group consisting of hetero-membered linear alkylene diamines having the formula $H_2N—R_1—O—R_2—NH_2$, $H_2—N—R_1—O—R_2—O—R_3—NH_2$,
   $H_2—N—R_1—S—R_2—NH_2$, and carbonates thereof, wherein $R_1$ and $R_2$ are alkylene groups having from 1 to 5 carbon atoms and $R_3$ is an alkylene group having 4 carbon atoms.
   (c) a diamide selected from the group consisting of urea, thiourea and methylene diurea, to substantially produce two molecular condensation products of $a+c$ and $b+c$, continuing heating in a second stage said condensation products at a temperature of 130° C. to 230° C. until the evolution of ammonia substantially ceases and polymers are produced wherein both terminal radicals are amino radicals and thereafter raising the temperature and heating in a third stage said polymers at a temperature in the range of from 230° C. to 260° C. at a pressure of approximately 1 mm. Hg from 2 to 3 hours to produce said polyurea copolymers.

2. The process according to claim 1, wherein the reactants are initially mixed with a viscosity stabilizer selected from the group consisting of alkylene monoamide, N-acyl alkylene diamine, alkyl monobasic acids, and acyl monobasic acids, wherein said monobasic acids have at least 3 carbon atoms.

3. The process according to claim 1 wherein the mole ratio of amines to diamide is maintained in the range of from 1–1.5:1.

4. The process of claim 1 wherein (a) is hexamethylene diamine, (b) is 5,5'-diamino-dipentyl ether and (c) is urea.

5. The process of claim 1 wherein
   (a) is the carbonate of octamethylene diamine,
   (b) is the carbonate of 4,4'-diamino dibutyl ether and
   (c) is urea.

6. The process of claim 1 wherein
   (a) is nonamethylenediamine
   (b) is 3,5'-diaminopropyl-amyl ether and
   (c) is methylene diurea.

7. The process of claim 1 wherein
   (a) is a mixture of octamethylene diamine and hexamethylene diamine,
   (b) is 5,5'-diamino diamyl sulfide and
   (c) is urea.

8. The process of claim 1 wherein
   (a) is hexamethylene diamine,
   (b) is ethylene glycol bis(4-amino butyl ether) and
   (c) is urea.

9. The process of claim 1 wherein
   (a) is the carbonate of heptamethylene diamine,
   (b) is the carbonate of 4,4'-diamino dibutyl ether and
   (c) is thiourea.

10. The process of claim 1 wherein
   (a) is octamethylene diamine,
   (b) is 5,5'-diamino diamyl sulfide and
   (c) is thiourea.

11. The process according to claim 1 wherein the reaction is initiated in a solvent selected from the group consisting of water, phenol and metacresol.

References Cited in the file of this patent

UNITED STATES PATENTS 2,852,494 Lehmann _____ Sept. 16, 1958

FOREIGN PATENTS

| | | | |
|---|---|---|---|
| 619,275 | Great Britain | _____ | Mar. 7, 1949 |
| 530,267 | Great Britain | _____ | Dec. 9, 1940 |
| 534,699 | Great Britain | _____ | Mar. 14, 1941 |
| 619,275 | Great Britain | _____ | Mar. 7, 1949 |